(12) United States Patent
Ford et al.

(10) Patent No.: US 7,360,991 B2
(45) Date of Patent: Apr. 22, 2008

(54) METHODS AND APPARATUS FOR FABRICATING GAS TURBINE ENGINES

(75) Inventors: Gregory M. Ford, Cincinnati, OH (US); Eric Keith, West Chester, OH (US); Joshua Miller, West Chester, OH (US); David E. Budinger, Loveland, OH (US); Glenn H. Nichols, Mason, OH (US)

(73) Assignee: General Electric Company, Schenectady, NY (US)

( * ) Notice: Subject to any disclaimer, the term of this patent is extended or adjusted under 35 U.S.C. 154(b) by 40 days.

(21) Appl. No.: 10/864,155

(22) Filed: Jun. 9, 2004

(65) Prior Publication Data

US 2005/0276687 A1    Dec. 15, 2005

(51) Int. Cl.
*F03B 11/00*    (2006.01)

(52) U.S. Cl. ................................. 415/173.1; 428/668

(58) Field of Classification Search ............ 415/173.1, 415/200, 213.1; 428/553, 668, 678, 679; 228/119, 182
See application file for complete search history.

(56) References Cited

U.S. PATENT DOCUMENTS

| | | | |
|---|---|---|---|
| 3,986,720 A | | 10/1976 | Knudsen et al. |
| 4,684,401 A | * | 8/1987 | Ladd et al. ................. 420/436 |
| 4,692,305 A | * | 9/1987 | Rangaswamy et al. ...... 420/436 |
| 4,815,933 A | | 3/1989 | Hansel et al. |
| 5,066,459 A | * | 11/1991 | Beltran et al. .............. 420/588 |
| 5,127,793 A | | 7/1992 | Walker et al. |
| 5,240,491 A | * | 8/1993 | Budinger et al. ............. 75/255 |
| 5,482,530 A | * | 1/1996 | Hohne ......................... 75/230 |
| 5,593,276 A | * | 1/1997 | Proctor et al. ........... 415/173.1 |
| 5,634,767 A | | 6/1997 | Dawson |
| 5,916,518 A | * | 6/1999 | Chesnes ..................... 420/438 |
| 6,164,916 A | | 12/2000 | Frost et al. |
| 6,233,822 B1 | | 5/2001 | Grossklaus, Jr. et al. |
| 6,302,318 B1 | | 10/2001 | Hasz et al. |
| 6,398,103 B2 | * | 6/2002 | Hasz et al. ................. 228/119 |
| 6,412,149 B1 | | 7/2002 | Overberg |
| 6,413,043 B1 | | 7/2002 | Bouyer |
| 6,435,820 B1 | | 8/2002 | Overberg |

(Continued)

FOREIGN PATENT DOCUMENTS

EP    1516942 A1    3/2005

(Continued)

OTHER PUBLICATIONS

International Search Report; Place of Search—London; dated Sep. 30, 2005; Reference 13DV-154425/10709; Application No. GB0511597.7; 6 Pgs.

(Continued)

*Primary Examiner*—Edward K. Look
*Assistant Examiner*—Nathan Wiehe
(74) *Attorney, Agent, or Firm*—William Scott Andes; Armstrong Teasdale LLP

(57) ABSTRACT

Methods and apparatus of fabricating a gas turbine engine component are provided. The method includes selecting a surface of a component to apply a wear-resistant material, applying a formed wear pad fabricated from a wear-resistant alloy and a braze material, and vacuum brazing the component and applied wear pad wherein the wear-resistant alloy is bonded to the component surface using the braze material.

7 Claims, 3 Drawing Sheets

U.S. PATENT DOCUMENTS

| | | |
|---|---|---|
| 6,451,454 B1 * | 9/2002 | Hasz et al. .................. 428/668 |
| 6,485,678 B1 | 11/2002 | Liang et al. |
| 6,527,165 B1 * | 3/2003 | Budinger et al. ........... 228/226 |
| 6,530,971 B1 * | 3/2003 | Cohen et al. .................. 75/254 |
| 2001/0006187 A1 | 7/2001 | Hasz et al. |
| 2002/0119338 A1 | 8/2002 | Hasz et al. |
| 2003/0183529 A1 | 10/2003 | Ohara et al. |
| 2004/0084423 A1 | 5/2004 | Grossidaus, Jr. et al. |
| 2004/0086635 A1 | 5/2004 | Grossidaus, Jr. et al. |
| 2005/0181231 A1 * | 8/2005 | Gupta et al. ................ 428/668 |

FOREIGN PATENT DOCUMENTS

| | | |
|---|---|---|
| EP | 1563937 A2 | 8/2005 |
| JP | 02-137664 | 5/1990 |
| JP | 2001-212665 | 8/2001 |

OTHER PUBLICATIONS

Michael Carter, Jacob Colvin, and James Sears; Characterization of Conductive inks deposited with Maskless Mesoscale Material Deposition (M3D) (8 pgs.); Department of Material and Metallurgical Engineering Additive Manufacturing Laboratory; South Dakota School of Mines & Technology, Rapid City, SD 57701.

James Sears, Michael Carter, and Jacob Colvin; Characterization of Conductive Inks Deposited with Maskless Mesoscale Material Deposition (8 pgs.); TMS 2006 Annual Meeting; Mar. 12-16, 2006, San Antonio, TX.

* cited by examiner

METHODS AND APPARATUS FOR FABRICATING GAS TURBINE ENGINES

BACKGROUND OF THE INVENTION

This invention relates generally to turbine engines, and more specifically to a method and apparatus for coupling a wear-resistant material to a turbine engine component.

At least some known gas turbine engines include a forward fan, a core engine, and a power turbine. The core engine includes at least one compressor that provides pressurized air to a combustor wherein the air is mixed with fuel and ignited for generating hot combustion gases. The combustion gases flow downstream to one or more turbines that extract energy therefrom to power the compressor and provide useful work, such as powering an aircraft. A turbine section may include a stationary turbine nozzle positioned at the outlet of the combustor for channeling combustion gases into a turbine rotor disposed downstream thereof. At least some known turbine rotors include a plurality of circumferentially spaced apart turbine blades extending radially outwardly from a rotor disk that rotates about the centerline axis of the engine.

The turbine section also includes a shroud assembly coupled downstream from the turbine nozzle. The shroud assembly circumscribes the turbine rotor and defines an outer boundary for the hot combustion gases flowing through the turbine. At least some known shroud assemblies include a shroud hanger member that is coupled to an outer casing of the engine to provide support to a plurality of shrouds positioned adjacent to the tips of the high-pressure turbine blades. At least some known shroud hanger members include an axially forward flange that is positioned in compressive engagement to a mating surface on the circumferentially spaced apart nozzle segments.

The combination of differing rates of thermal expansion between adjacently coupled shroud hangers and turbine nozzle segments, the dynamic effects of the engine, for example, vibration and/or high compression contact between shroud hangers and turbine nozzle segments may result in wear of the shroud hanger at the interface. Over time, a worn surface may adversely affect turbine operating performance, and/or shorten the engine maintenance cycle-time. A wear-resistant coating, such as a thermal spray of a wear-resistant alloy, may be applied to the shroud hanger during fabrication to facilitate minimizing wear. However, such coatings may be susceptible to chipping, and a high level of manufacturing effort and cycle-time impact due to thermal spray processes may result in relatively high manufacturing costs.

BRIEF DESCRIPTION OF THE INVENTION

In one embodiment, a method of fabricating a gas turbine engine component is provided. The method includes selecting a surface of a component to apply a wear-resistant material, applying a formed wear pad fabricated from a wear-resistant alloy and a braze material, and brazing the component and applied wear pad wherein the wear-resistant alloy is bonded to the component surface using the braze material.

In another embodiment, a newly manufactured component is provided. The component includes a surface, and a wear-resistant material diffusion bonded to the surface using a wear pad that is pre-formed, the wear pad including a sintered braze material powder and a wear-resistant alloy powder mixture, the wear-resistant material having a machined surface that defines a wear surface of the component, the wear-resistant material including the braze material and the wear-resistant alloy mixture.

In yet another embodiment, a gas turbine engine assembly is provided. The gas turbine engine assembly includes a compressor, a high-pressure turbine coupled to the compressor by a rotor shaft, and a shroud assembly at least partially circumscribing the turbine, the shroud assembly including a shroud hanger member having a forward face having a surface and a wear-resistant material applied to the surface using a brazing process, the wear-resistant material including wear-resistant material including a mixture of between approximately 5% and 40% of a braze material, by weight and between approximately 60% and 95% of a wear-resistant alloy material, by weight, the braze material including, by weight, between approximately 22.5% and 24.25% chromium, between approximately 9.0% and 11.0% nickel, between approximately 6.5% and 7.5% tungsten, between approximately 3.0% and 4.0% tantalum, between approximately 2.6% and 3.0% boron, the remainder including cobalt, minor alloying elements, and incidental impurities, the wear-resistant alloy including, by weight, between approximately 27% and 29% molybdenum, between approximately 16.5% and 17.5% chromium, between approximately 3.0% and 3.5% silicon, less than approximately 3% iron, less than approximately 3% nickel, the remainder including cobalt, minor alloying elements, and incidental impurities.

DETAILED DESCRIPTION OF THE INVENTION

As used herein, the term "component" may include any component configured to be coupled with a gas turbine engine that may be coated with a wear-resistant material, for example a turbine shroud hanger. A turbine shroud hanger is intended as exemplary only, and thus is not intended to limit in any way the definition and/or meaning of the term "component". Furthermore, although the invention is described herein in association with a gas turbine engine, and more specifically for use with a turbine shroud hanger for a gas turbine engine, it should be understood that the present invention is applicable to other gas turbine engine stationary components and rotatable components. Accordingly, practice of the present invention is not limited to turbine shroud hangers for a gas turbine engine. In addition, although the invention is described herein in association with a vacuum braze process, it should be understood that the present invention may be applicable to any diffusion joining process, for example, activated diffusion healing. Accordingly, practice of the present invention is not limited to vacuum brazing.

Figure 1:
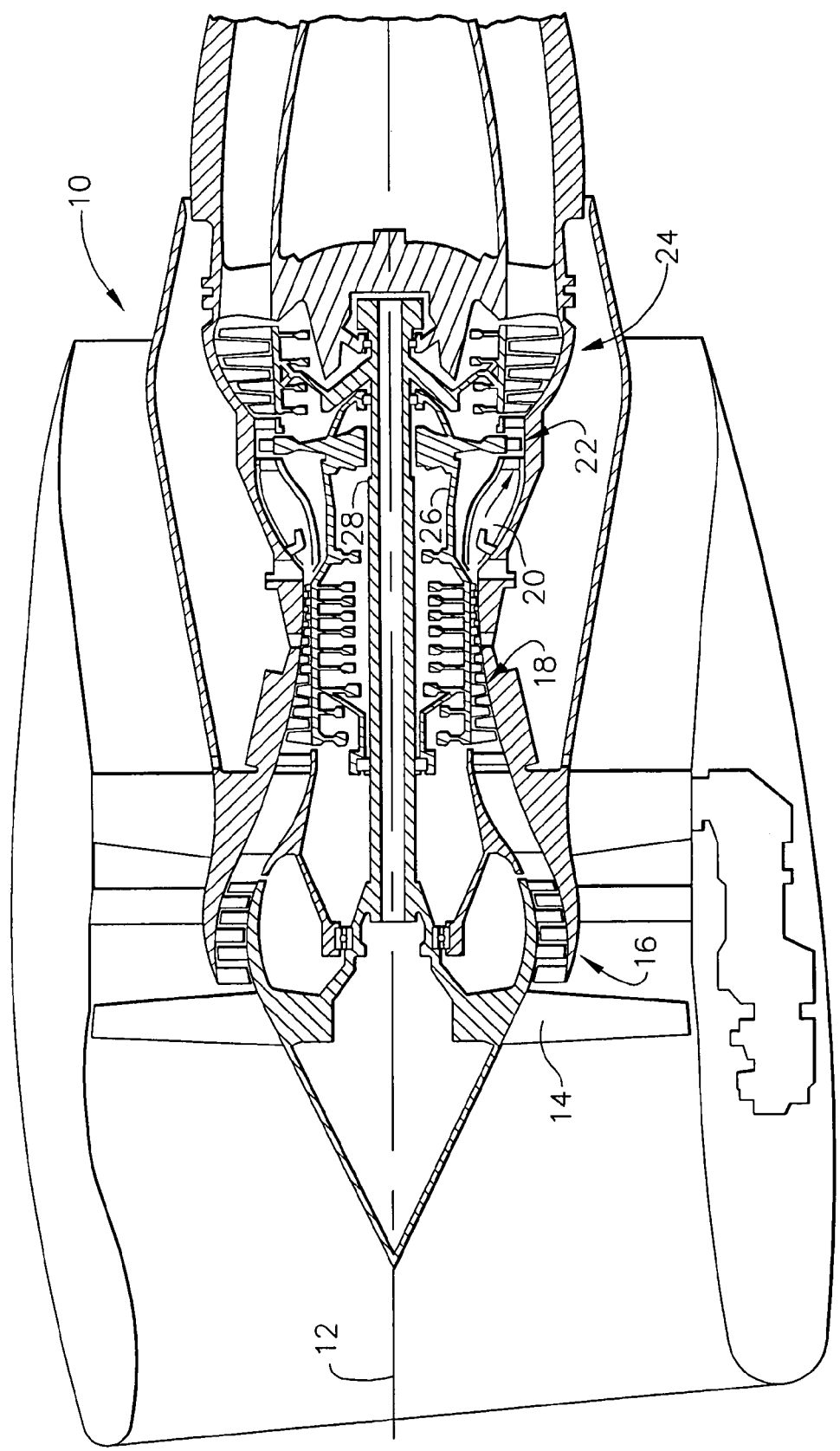
FIG. 1 is a longitudinal cross-sectional view of an exemplary high bypass ratio turbofan engine.

FIG. 1 is a longitudinal cross-sectional view of an exemplary high bypass ratio turbofan engine 10. Engine 10 includes, in serial axial flow communication about a longitudinal centerline axis 12, a fan 14, a booster 16, a high-pressure compressor 18, a combustor 20, a high-pressure turbine 22, and a low-pressure turbine 24. High-pressure turbine 22 is drivingly connected to high-pressure compressor 18 with a first rotor shaft 26, and low-pressure turbine 24 is drivingly connected to booster 16 and fan 14 with a second rotor shaft 28.

During operation of engine 10, ambient air passes through fan 14, booster 16, and compressor 18, the compressed air stream enters combustor 20 where it is mixed with fuel and burned to provide a high-energy stream of hot combustion gases. The high-energy gas stream passes through high-pressure turbine 22 to drive first rotor shaft 26. The gas stream passes through low-pressure turbine 24 to drive second rotor shaft 28, fan 14, and booster 16. Spent combustion gases exit out of engine 10 through an exhaust duct (not shown).

It should be noted that although the present description is given in terms of a turbofan aircraft engine, embodiments of the present invention may be applicable to any gas turbine engine power plant such as that used for marine and industrial applications. The description of the engine shown in FIG. 1 is only illustrative of the type of engine to which some embodiments of the present invention is applicable.

Figure 2:
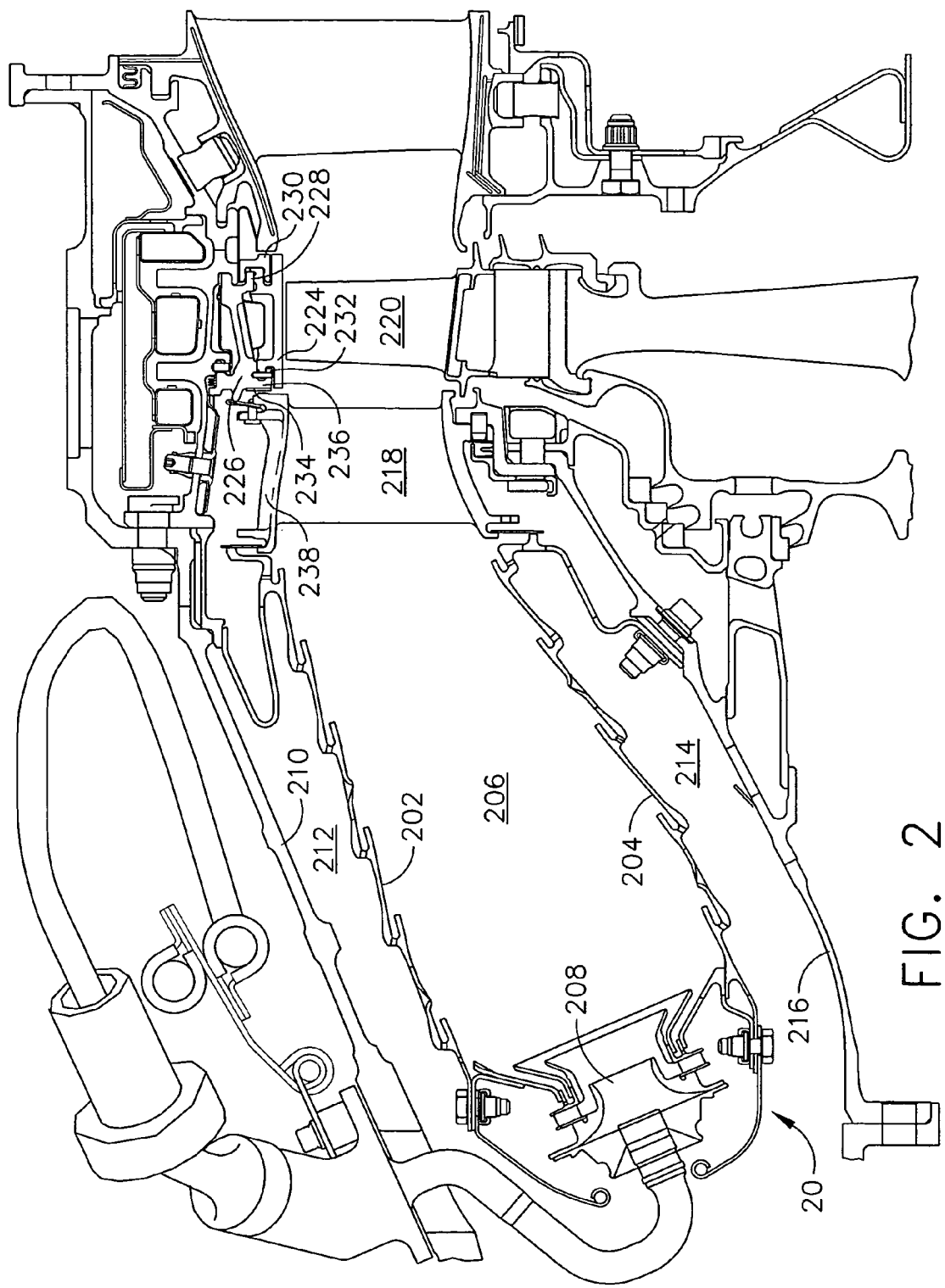
FIG. 2 is a detailed partial sectional view of a portion of the gas turbine engine shown in FIG. 1.

FIG. 2 is a detailed partial sectional view of a portion of gas turbine engine 10 (shown in FIG. 1). Combustor 20 includes an outer liner 202 and an inner liner 204 that define an annular combustion chamber 206 into which fuel is injected through a fuel nozzle 208 which extends inwardly through combustion case 210. Combustor 20 is partially cooled by airflow from compressor 18 into an annular passageway 212 defined by combustor outer liner 202 and combustion case 210. Similarly, on the inner side of combustor 20 an annular chamber 214 is defined by inner liner 204 and nozzle support structure 216 to cool that portion of combustor 20. Hot combustion gases, ignited and at least partially burned in combustor 20, flow rearwardly from combustion chamber 206 to a row of circumferentially spaced high-pressure nozzle segments 218, and then further rearwardly to impinge on the circumferentially spaced row of turbine blades 220 of high-pressure turbine 22. Circumscribing the row of high-pressure blades 220 in close clearance relationship therewith is an annular shroud 224. Shroud 224 may include a plurality of annular sectors attached at an inner side of a shroud hanger member 226 that is formed of a plurality of sectors that form a complete circle. Structural support for shroud 224 is provided by shroud hanger member 226 having at its rearward end a radially inwardly extending hook 228, which is coupled to shroud 224 by a U-shaped bracket 230. A forward end of shroud 224 is coupled to shroud hanger member 226 by a rearwardly extending collar 232.

A forward face 234 of collar 232 is in high compression contact with a rearward face 236 of a radially outward band 238 of high-pressure turbine nozzle segment 218. Forward face 234 and rearward face 236 define a boundary between cooling air from compressor 18 and combustion gases from combustor 20. The temperature of the cooling air from compressor 18 and the temperature of the combustion gases from combustor 20 may be variable with engine speed wherein different rates of thermal growth between collar 232 and high-pressure turbine nozzle segment 218 may result in relative movement and variations in the compressive forces between forward face 234 and rearward face 236. Such relative movement may cause wear damage to shroud hanger member 226 and high-pressure turbine nozzle segment 218.

Figure 3:
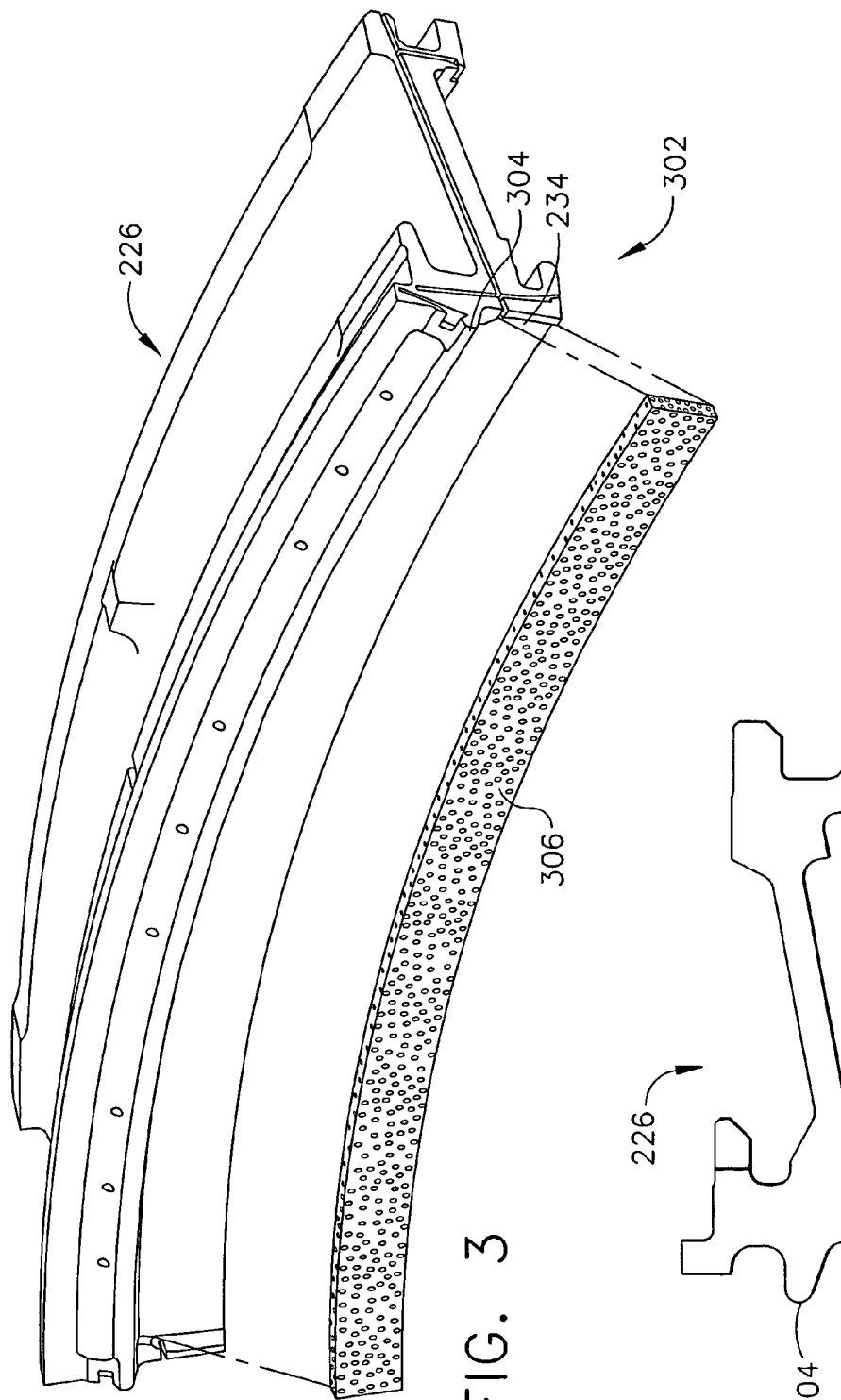
FIG. 3 is a perspective view of an exemplary shroud hanger member that may be used with the gas turbine engine shown in FIGS. 1 and 2.

FIG. 3 is a perspective view of an exemplary shroud hanger member 226 that may be used with gas turbine engine 10 (shown in FIGS. 1 and 2). Shroud hanger member 226 includes a forward flange 302 that includes a forward sealing lip 304 and forward face 234. Forward face 234 is configured for relatively high compression contact with outer band 238 of nozzle segment 218. Forward face 234 may slidingly move with respect to outer band 238, such that the combination of high compression force and relative movement between the contacting surfaces as a result of manufacturing tolerances, differing rates of thermal expansion, and dynamic effects during operation of the engine, over time may result in excessive wear of these surfaces.

A wear-resistant pad 306 may be applied to forward face 234 to facilitate reducing damage due to wear. In the exemplary embodiment, wear-resistant pad 306 is fabricated from a powder of metal or metal alloys with predetermined wear-resistant qualities. The powder of wear-resistant metal or alloy may be mixed with a braze material, formed to dimensions complementary to forward face 234, and pre-sintered to adhere the powder and braze material to maintain the formed dimensions of wear-resistant pad 306. In an alternative embodiment, wear-resistant pad 306 may be malleably formed to forward face 234.

Wear-resistant pad 306 may comprise a slurry mixture of braze powder, wear material powder, and a binder, for example, water-based organic materials such as polyethylene oxide and various acrylics, or solvent-based binders. The slurry mixture may be cast to form a green tape wear material or the green tape may be sintered to form a pre-formed and/or formable wear pad, such as wear-resistant pad 306. Use of the braze slurry compositions is advantageous in various situations. For example, when the final substrate surface is irregular, or contains pits or crevices, the braze slurry can be used to fill such regions.

In an alternative embodiment, the braze slurry composition can be applied to the surface region of the tape which will contact the desired region of the substrate. In another alternative embodiment, the braze slurry composition is applied to both the wear material green tape and the substrate region, which will be in contact with the tape.

The braze material may include a base constituent that is the same as the wear-resistant alloy, but with a lower melting temperature than the wear-resistant alloy. In the exemplary embodiment, the braze material is a cobalt-base alloy comprising, by weight, between approximately 22.5 and 24.25% chromium, between approximately 9.0 and 11.0% nickel, between approximately 6.5 and 7.5% tungsten, between approximately 3.0 and 4.0% tantalum, between approximately 2.6 and 3.0% boron, with the remainder comprising cobalt and minor or incidental elements such as carbon, zirconium, iron, silicon, manganese, copper, oxygen, nitrogen, selenium, phosphorus, and/or sulfur. A preferred nominal composition for the braze material is, by weight, approximately 23% chromium, approximately 10% nickel, approximately 7% tungsten, approximately 3.5% tantalum, and approximately 2.8% boron, with the remainder comprising cobalt and incidental impurities.

In the exemplary embodiment, the wear-resistant alloy is a cobalt-base alloy comprising, by weight, between approximately 27% and approximately 30% molybdenum, between approximately 16.5% and approximately 18.5% chromium, between approximately 3.0 and approximately 3.8% silicon, less than approximately 1.5% iron, less than approximately 1.5% nickel, less than approximately 0.03% sulfur, less than approximately 0.03% phosphorus, and less than approximately 0.08% carbon, with the remainder comprising cobalt and incidental impurities.

During fabrication, a powder of wear-resistant alloy and a powder of braze material are blended to form a powder mixture comprising between approximately 70% and 90% of the wear-resistant alloy, by weight, and the remainder comprising braze material. In the exemplary embodiment, the powder mixture comprises between approximately 79% and 81%, by weight, of the wear-resistant alloy and the remainder comprising braze material. In the exemplary embodiment, the braze material in the wear-resistant alloy matrix is uniformly dispersed. In an alternative embodiment, the braze material and the wear-resistant alloy are formed of alternating layers of the braze material and the wear-resistant alloy, such that, layers of the braze material are thinner than layers of the wear-resistant alloy.

The powder mixture may be formed into a pad of predetermined dimensions. A polymeric or organic binder may be used to facilitate the binding process and is capable of burning off at a temperature of not higher than approximately 1200.degree. F. (approximately 649.degree. C.) to leave no undesirable residues. The formed pad may be sintered or partially sintered at a temperature sufficient to fuse (agglomerate) the powder particles and burn off the binder (e.g., between approximately 200.degree. C. and 425.degree. C.). A final dimension may be achieved using a waterjet, laser or other suitable technique.

Wear-resistant pad 306 may be brazed, such as vacuum brazed, to forward face 234 of shroud hanger member 226 and then vacuum heat treated followed by aging. Wear-resistant pad 306 may be coupled to forward face 234 by a resistant welding method, for example, tack welding, or by adhesive. The braze process may be performed at a temperature of between approximately 2100° F. and 2300° F. (between approximately 1150° C. and 1260° C.) for between approximately ten minutes and sixty minutes. For example, at a temperature of between approximately 2195° F. and approximately 2225° F. (between approximately 1202° C. and approximately 1218° C.) for between approximately ten to twenty minutes in a vacuum of less than 1×10−3 torr (less than 1.3×10−3 mbar). In the exemplary embodiment, after the braze process, wear-resistant pad 306 may be inspected to ensure wear-resistant pad 306 has flowed smoothly and evenly on forward face 234 with a linear shrinkage of less than 5% and a thickness shrinkage of less than 20%, such that a wear-resistant material on forward face 234 is formed.

Figure 4:
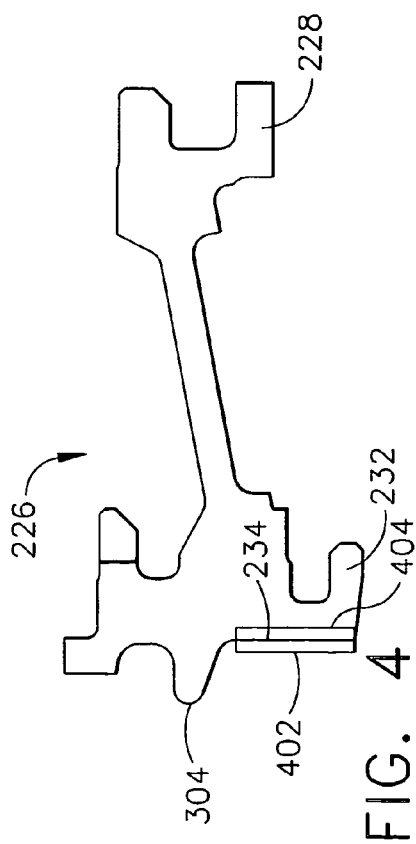
FIG. 4 is a cross-sectional profile view of the shroud hanger member shown in FIG. 3.

FIG. 4 is a cross-sectional profile view of shroud hanger member 226 (shown in FIG. 3). A wear-resistant material 402 is formed from the brazing of wear-resistant pad 306 to forward face 234. In the exemplary embodiment, bonding between wear-resistant material 402 and forward face 234 is at least 90% and a porosity of wear-resistant material 402 is less than approximately 4% by volume, with the major axis of any pore not exceeding 0.008 inches (approximately 0.2 mm) when measured by metallographic evaluation at 100×, and a maximum of one inclusion being present in any field of view examined at 50× magnification.

Wear-resistant material 402 may be aged to further bond a diffusion area 404 to forward face 234 at a temperature of between approximately 2000° F. and 2100° F. (between approximately 1090° C. and 1150° C.) for between approximately one hour and four hours. Other heat treatment steps may also be applied based on the type of metal shroud hanger member 226 is fabricated from, or to support other manufacturing processes. Shroud hanger member 226 then may be final machined to predetermined dimensions.

The above-described methods and apparatus are cost-effective and highly reliable for providing a wear-resistant material to newly manufactured components using a pre-formed sintered mixture of braze material powder and wear-resistant metal alloy powder, for example, in a pre-formed sintered composition. The methods and apparatus facilitate fabrication, assembly, and reduce the maintenance cycle-time of machines, and in particular gas turbine engines, in a cost-effective and reliable manner.

Exemplary embodiments of wear-resistant material methods and apparatus components are described above in detail. The components are not limited to the specific embodiments described herein, but rather, components of each apparatus may be utilized independently and separately from other components described herein. Each wear-resistant material method and apparatus component can also be used in combination with other wear-resistant material method and apparatus components.

While the invention has been described in terms of various specific embodiments, those skilled in the art will recognize that the invention can be practiced with modification within the spirit and scope of the claims.

What is claimed is:

1. A method of fabricating a gas turbine engine component, said method comprising:
   selecting a surface of a newly-manufactured component to apply a wear pad;
   forming a wear pad including a layer of wear-resistant alloy powder particles and a layer of braze powder particles, wherein the layer of braze powder particles is thinner than the layer of wear-resistant alloy powder particles, such that the wear pad is shaped complementary to the surface of the component;
   pre-sintering the layers to facilitate fusing the powder particles together such that the powder particles maintain the complementary shape;
   applying the formed wear pad to the component surface;
   brazing the component to facilitate bonding the wear pad to the component surface; and
   machining a surface of the wear pad to remove a portion of the wear pad.

2. A method in accordance with claim 1 further comprising vacuum heat-treating and aging the component.

3. A method in accordance with claim 1 wherein brazing the component comprises vacuum brazing the component.

4. A method in accordance with claim 1 wherein selecting a surface of a component to apply a wear pad comprises selecting a surface of a newly fabricated turbine shroud hanger to apply the wear pad.

5. A method in accordance with claim 1 wherein the braze material comprises, by weight, between approximately 20.0% and 25.0% chromium, between approximately 8.0% and 12.0% nickel, between approximately 5.0% and 9.0% tungsten, between approximately 2.0% and 5.0% tantalum, between approximately 1.5% and 5.0% boron, the remainder comprising cobalt, minor alloying elements, and incidental impurities.

6. A method in accordance with claim 5 wherein the braze material comprises, by weight, between approximately 22.5% and 24.25% chromium, between approximately 9.0% and 11.0% nickel, between approximately 6.5% and 7.5% tungsten, between approximately 3.0% and 4.0% tantalum, between approximately 2.6% and 3.0% boron, the remainder comprising cobalt, minor alloying elements, and incidental impurities.

7. A method in accordance with claim 1 wherein the wear-resistant alloy powder particles comprise, by weight, between approximately 27% and 30% molybdenum, between approximately 16.5% and 18.5% chromium, between approximately 3.0% and 3.8% silicon, less than approximately 1.5% iron, less than approximately 1.5% nickel, the remainder comprising cobalt, minor alloying elements, and incidental impurities.

* * * * *